C. F. ECKART.
PROCESS FOR KILLING OR CHECKING THE GROWTH OF WEEDS.
APPLICATION FILED DEC. 1, 1914.
1,196,219. Patented Aug. 29, 1916.
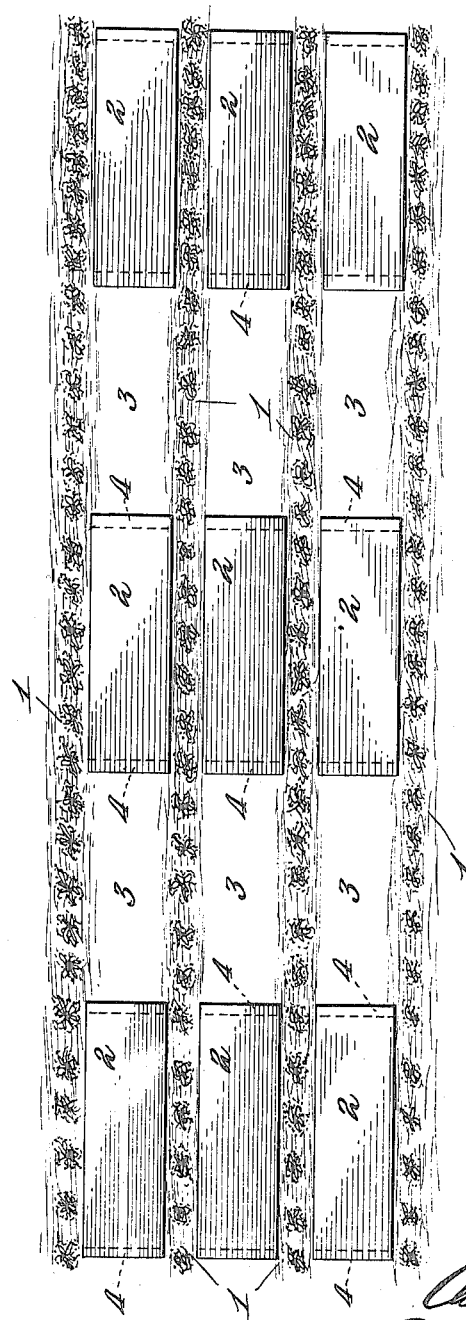

UNITED STATES PATENT OFFICE.

CHARLES FRANKLIN ECKART, OF OLAA, TERRITORY OF HAWAII.

PROCESS FOR KILLING OR CHECKING THE GROWTH OF WEEDS.

1,196,219.   Specification of Letters Patent.   Patented Aug. 29, 1916.

Application filed December 1, 1914. Serial No. 875,019.

*To all whom it may concern:*

Be it known that I, CHARLES FRANKLIN ECKART, a citizen of the United States, residing at Olaa, in the county of Hawaii and Territory of Hawaii, have invented certain new and useful Improvements in Processes for Killing or Checking the Growth of Weeds; and I do hereby declare the following to be a full, clear, and exact description of the invention, such as will enable others skilled in the art to which it appertains to make and use the same.

This invention relates to means for killing or checking the growth of weeds between the rows of cultivated plants, such as sugar-cane for example, and particularly to means for systematically and intermittently covering the weed producing areas for such intervals of time as will either kill the weeds or at least check their growth.

It also relates to means for reducing the weed infestation of fields by the destruction of successive growths or crops of weeds before the seed bearing period is reached.

It has for its object a novel process for killing or checking the growth of weeds between rows of cultivated plants, which contemplates the employment of simple and efficient means for shading or smothering the weeds to deprive them of light and air and to create temperature conditions which are excessively injurious to them in their induced etiolated state.

The usual methods for destroying weed growth between the rows of cultivated plants are by running a cultivator or the like between the rows and by hoeing. Spraying the weeds with a deleterious solution, such as arsenite of soda, is also sometimes resorted to with good results. These methods, however, can only be employed to best advantage in comparatively good weather. It is desirable, therefore, that other means be provided for accomplishing this result, particularly in locations which are subject to bad weather conditions or to shortage of manual or animal labor for field work.

The present invention contemplates the employment of portable artificial mulshes, which are spread over and allowed to rest for a sufficient time interval on top of the ground or weeds between the rows of cultivated plants, and then dragged or carried along between the rows and similarly used in a new position, in a systematic manner as hereinafter described. These portable mulshes are composed of pieces or strips of metal, fabric, paper or other material which is naturally sufficiently effective and durable, or has been specially treated to render it so.

The accompanying drawing, forming a part of this specification, represents in plan a portion of a cultivated field and the portable mulshes I employ.

In carrying out the process in the preferred manner, the strips of covering material, of sufficient width to cover the space between two adjacent rows of cultivated plants and of a convenient length for handling, are set at suitable distances apart, as shown.

1 represents the rows of cultivated plants, 2 the strips or portable mulshes, and 3 the uncovered intervening spaces between the plant rows 1 and also between the strips 2. The space 3 should be longitudinally less than the length of the strips 2. The strips 2 are allowed to remain undisturbed for such time as to effectively check or destroy the weed growth which occupied the ground prior to covering. At the end of this time, the strips 2 are moved and superimposed upon the previously uncovered area 3, where they remain until the underlying weeds have been sufficiently checked or destroyed; whereupon the strips are moved back to their first position, and so on until the cultivated plants have attained such growth that the treatment may be dispensed with. Since the uncovered spaces 3 are somewhat shorter than the length of the covering strips 2, the latter cause small transverse sections 4 of the intervening space between the plant rows 1 to be continually covered, thus precluding a relative inefficiency of the strip ends under which a certain amount of light may be expected to gain access.

It will now be noted, that the portable mulshes or strips 2 can be used in any weather, that having accomplished their purpose in one position they are moved so as to rest on fresh weedy areas contiguous to those on which the treatment has, for the time being, just been completed, that the weeds under the strips are checked or destroyed due to the lack of sufficient light and air or the action of radiated solar heat on the etiolated plants and that the necessity of hoeing or cultivating between the rows for the purpose of weed destruction is thus obviated. It will also be noted, that the time for changing the position of the mulshes can be so gaged as to prevent the formation of fresh weed seeds, so that with the continued or successive destruction of the resulting plants, the weed producing capacity of the treated area will finally become greatly reduced to the corresponding advantage of the cultivated plants. It will further be noted that no preliminary treatment of the weeds or ground is required before the successive placings of the strips, and that this greatly adds to the economy of the process. The lower the specific heat of the material employed in the process, the more rapid will be the destructive action on the weeds due to the higher temperatures of the radiated solar heat to which the weakened and etiolated plants are subjected during and shortly following any periods of sunshine.

The value of this invention resides essentially in the great utility which is derived from a combination of common principles through their application in a novel manner and in such a way that they are applied intermittently and systematically as a definite process in the profitable agricultural procedure contemplated.

The benefits to be derived are primarily as follows:

(a) A very large part of the cultivated area would always have the weeds of the spaces between the rows under full control at any given time no matter how serious the weather or the labor conditions might be.

(b) The maximum growth of the weeds in the spaces between the rows can be very much reduced below the maximum growth attained by the weeds under ordinary cultural systems with many crops.

(c) Keeping the weeds down in the spaces between the rows in the manner as described would reduce the encroachment of weeds in the rows of the cultivated plants.

(d) The intermittent and systematic destruction of weeds in the spaces between the rows at comparatively short intervals, thus preventing the seeding of the weeds, would ultimately greatly reduce the number of weeds which spring up in the fields.

(e) The mulshes from the practical stand point would take the place of labor, both manual and animal, and would therefore represent an important means of keeping the young plants growing in a satisfactory manner even during acute shortage of labor. After the placing of the mulshes at the start, one man can readily take care of a comparatively large area in a day in so far as changing the position of the mulshes is concerned.

(f) During dry weather these mulshes conserve the soil moisture and promote the growing and earlier closing in of the plants, such as sugar-cane for example.

(g) During cold weather the daily fluctuation of the soil temperature is lessened to the general advantage of the cultivated plants.

(h) Weeds are destroyed without cutting or disturbing the roots of the cultivated plants with cultivation implements.

(i) Passing implements through the rows always causes more or less of the cultivated plants to be broken. By the use of the portable mulshes in the manner described a loss of this nature would be reduced to a minimum or entirely obviated.

I claim:

1. The process of killing or checking the growth of weeds between the rows of cultivated plants, which consists in placing a row of separate portable coverings in longitudinally spaced relation over the ground between the rows of plants and subsequently moving each of said coverings to a new position to cover an adjacent uncovered portion of the ground.

2. The process of killing or checking the growth of weeds between the rows of cultivated plants, which consists in placing a row of separate portable coverings in longitudinally spaced relation over the ground between the rows of plants so that the strips of ground between said rows will present alternate covered and uncovered portions, and after a predetermined time moving the coverings to new positions in which they cover the previously uncovered portions of the ground.

3. The process of killing or checking the growth of weeds between the rows of cultivated plants, which consists in smothering the weeds over a plurality of separate areas between the rows of plants by means of separate portable coverings and subsequently smothering the weeds over the remaining areas by moving each of the coverings longitudinally between the corresponding rows of plants to a new position.

In testimony whereof I affix my signature, in presence of two witnesses.

CHARLES FRANKLIN ECKART.

Witnesses:
C. A. SHOTT,
J. D. AITKEN.